United States Patent
Navare et al.

(10) Patent No.: US 6,782,411 B2
(45) Date of Patent: Aug. 24, 2004

(54) VIRTUALIZING AND CONTROLLING INPUT AND OUTPUT OF COMPUTER PROGRAMS

(75) Inventors: Prashant Navare, Fremont, CA (US); Randall G. Menna, San Jose, CA (US)

(73) Assignee: Tarantella, Inc., Santa Cruz, CA (US)

( * ) Notice: Subject to any disclaimer, the term of this patent is extended or adjusted under 35 U.S.C. 154(b) by 306 days.

(21) Appl. No.: 10/141,366

(22) Filed: May 6, 2002

(65) Prior Publication Data

US 2002/0133630 A1 Sep. 19, 2002

Related U.S. Application Data

(63) Continuation of application No. 09/104,038, filed on Jun. 24, 1998, now Pat. No. 6,412,015.

(51) Int. Cl.[7] ............................................. G06F 15/16
(52) U.S. Cl. ...................................... 709/203; 709/227
(58) Field of Search ................................ 709/250, 238, 709/229, 227, 203, 245; 718/1, 100, 105; 719/302, 310, 316, 317, 319, 328, 329, 333, 400

(56) References Cited

U.S. PATENT DOCUMENTS

| | | | |
|---|---|---|---|
| 4,454,593 A | 6/1984 | Fleming et al. | |
| 4,642,790 A | 2/1987 | Minshull et al. | |
| 4,858,114 A | 8/1989 | Heath et al. | |
| 5,442,791 A | 8/1995 | Wrabetz et al. | |
| 5,502,839 A | 3/1996 | Kolnick | |
| 5,551,030 A | 8/1996 | Linden et al. | |
| 5,867,661 A | 2/1999 | Bittinger et al. | |
| 5,899,810 A * | 5/1999 | Smith | 463/42 |
| 5,903,725 A | 5/1999 | Colyer | |
| 5,920,725 A | 7/1999 | Ma et al. | |
| 5,925,100 A | 7/1999 | Drewry et al. | |
| 5,941,988 A | 8/1999 | Bhagwat et al. | |
| 5,943,496 A | 8/1999 | Li et al. | |
| 5,960,173 A | 9/1999 | Tang et al. | |
| 5,961,582 A | 10/1999 | Gaines | |
| 5,961,594 A | 10/1999 | Bouviet et al. | |
| 5,968,127 A | 10/1999 | Kawabe et al. | |
| 5,987,523 A | 11/1999 | Hind et al. | |
| 5,999,972 A | 12/1999 | Gish | |
| 6,003,065 A | 12/1999 | Yan et al. | |
| 6,003,084 A | 12/1999 | Green et al. | |
| 6,006,230 A | 12/1999 | Ludwig et al. | |
| 6,006,278 A | 12/1999 | Cottrill | |
| 6,012,083 A | 1/2000 | Savitzky et al. | |
| 6,014,651 A | 1/2000 | Crawford | |
| 6,014,702 A | 1/2000 | King et al. | |
| 6,018,805 A | 1/2000 | Ma et al. | |
| 6,035,324 A | 3/2000 | Chang et al. | |
| 6,070,184 A | 5/2000 | Blount et al. | |
| 6,148,340 A | 11/2000 | Bittinger et al. | |
| 6,192,418 B1 | 1/2001 | Hollberg et al. | |
| 6,226,690 B1 | 5/2001 | Banda et al. | |
| 6,240,447 B1 | 5/2001 | Banga et al. | |
| 2002/0133630 A1 * | 9/2002 | Navare et al. | 709/250 |

* cited by examiner

*Primary Examiner*—Bunjob Jaroenchonwanit
(74) *Attorney, Agent, or Firm*—Gray Cary Ware & Freidenrich (57) ABSTRACT

Networked processors application provide and operating system in one machine, application proxy and operating system on another machine, and virtualized input or output coupling to operating system of the another machine. Client responds to applied input and executes application proxy to apply output, while server executes application, and proxy interface sends applied input to server so server executes application per applied input and generates applied output. Proxy interface sends generated output for virtual display by client.

19 Claims, 10 Drawing Sheets

VIRTUALIZING AND CONTROLLING INPUT AND OUTPUT OF COMPUTER PROGRAMS

This application is a continuation of U.S. patent application Ser. No. 09/104,038 filed Jun. 24, 1998 now U.S. Pat. No. 6,412,015.

FIELD OF INVENTION

The invention relates to computer system user interface, particularly to virtualization and control of input and output of computer programs.

BACKGROUND OF INVENTION

Conventional computer systems provide peripheral devices and drivers for input (e.g., keyboard, mouse, microphone, etc.) and output (e.g., display, speaker, etc.) Ordinarily, application programs which run on such computer systems execute assuming that I/O devices and drivers couple physically to same processing machine where such application(s) run. In certain cases, however, such as networked multi-computer systems, it would be desirable to provide that computer application and I/O not reside on identical system. Prior related techniques are described, for example, in U.S. Pat Nos. 4,454,593, 4,642,790, 4,858,114, and 5,502,839. Such references, however, are variously limited, particularly with respect to achieving optimized network flexibility and performance. Accordingly, there is a need for improved method and apparatus for controlling and virtualizing program I/O in network computing systems.

SUMMARY OF INVENTION

The invention resides in computing system and methodology for controlling and virtualizing input and output of computer programs. Networked processors provide application, proxy interface and operating system in one machine, application proxy and operating system on other machine, and virtualized input or output coupling effectively therebetween.

In particular, one or more client processors respond to input applied respectively thereto and execute one or more application proxies to apply outputs respectively. Meanwhile, one or more server processors execute one or more applications, wherein one or more proxy interfaces send respective applied input to certain server processors so that such server processors execute certain applications per applied input and generate applied output respectively. Proxy interfaces send generated output for virtual display by certain client processors.

DETAILED DESCRIPTION

Figure 1:
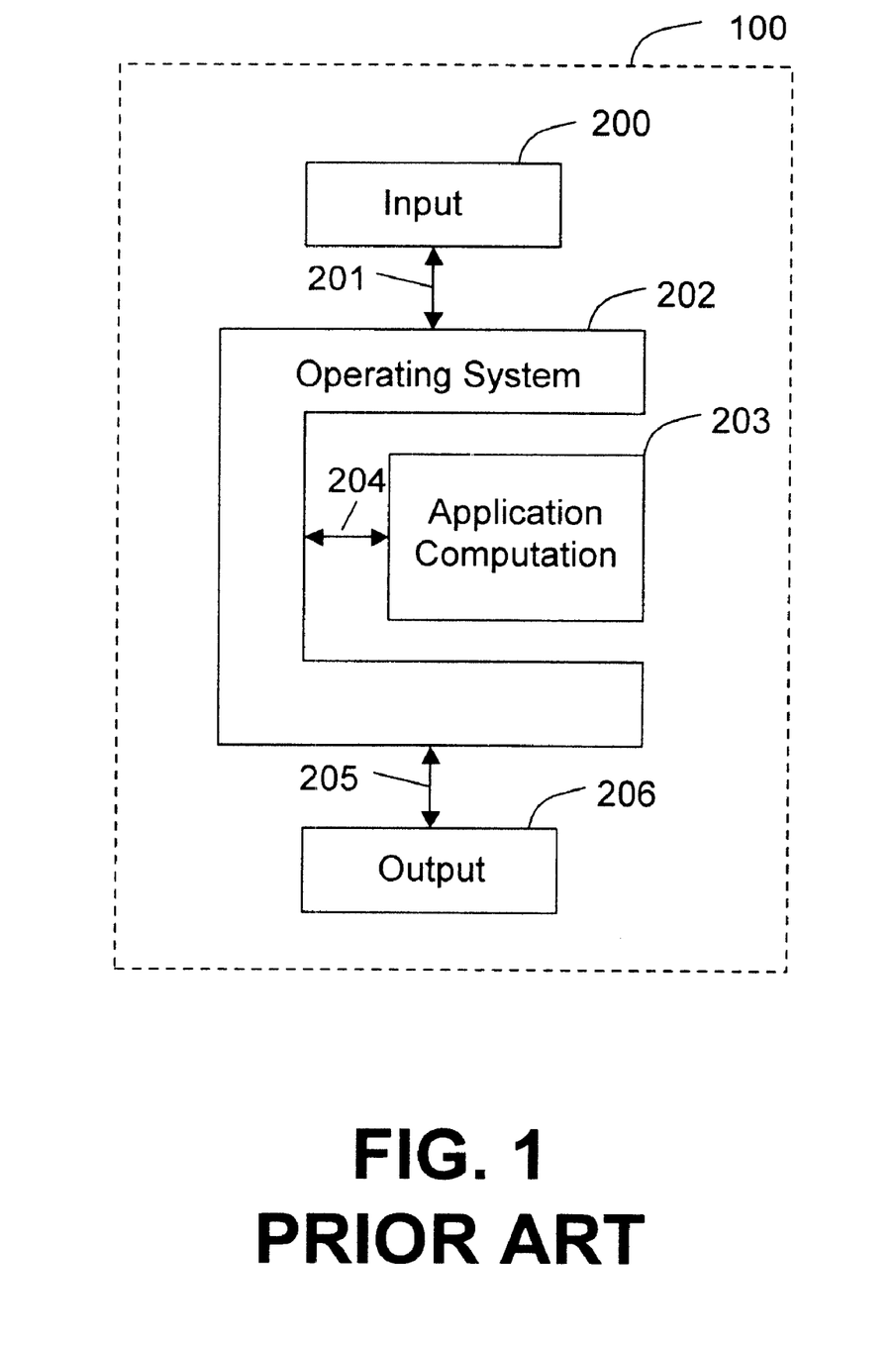
FIG. 1 is a block diagram of conventional computer system (PRIOR ART).

FIG. 1 shows conventional computer system and software 100 including application program 203 installed 204 with operating system (OS) 202, and input driver and/or device 200 coupled 201 thereto and output device and/or driver 206 coupled 205 thereto. Typically, system 100 is provided on conventional hardware equipment including processor, storage and other computer peripherals.

Figure 2:
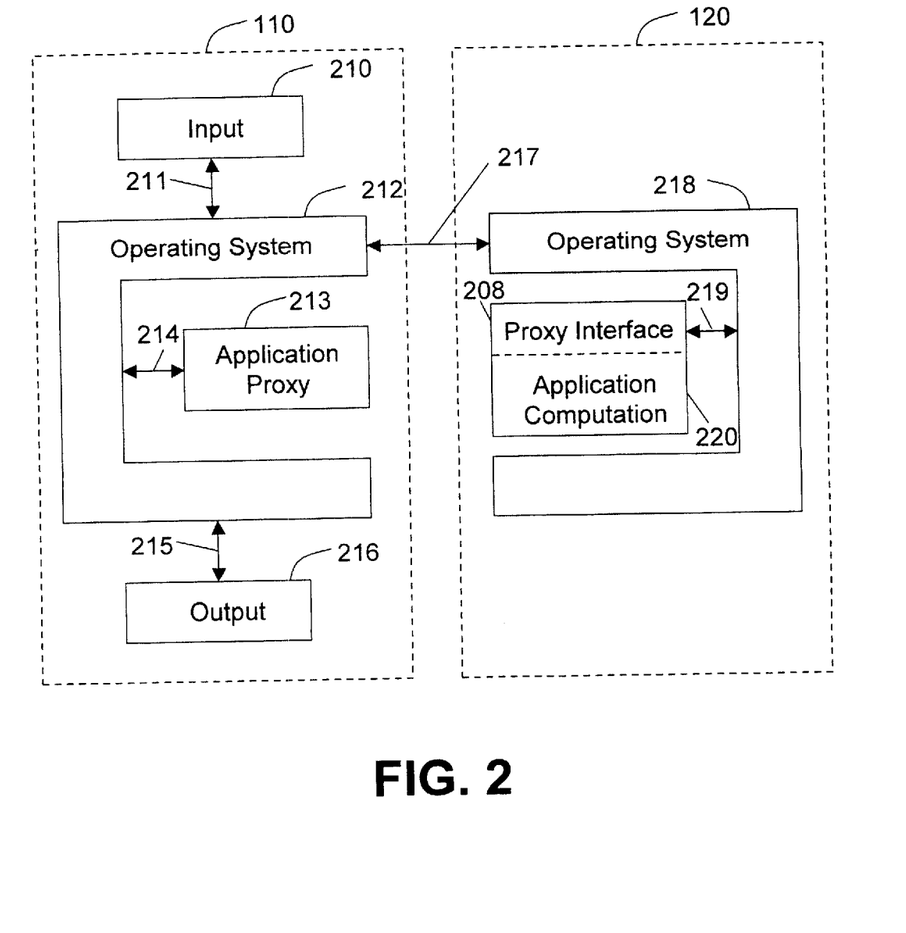
FIG. 2 is a block diagram of computer system according to present invention.

FIG. 2 shows networked computer system diagram according to present invention, including client processor portion (client) 110 and server processor portion (server) 120 coupled 217 thereto, preferably using conventional network interconnect protocol stack. Client 110 includes application proxy 213 installed 214 with operating system 212, and input driver and/or device 210 coupled 211 thereto and output device and/or driver 216 coupled 215 thereto. Client 110 may be provided on conventional hardware equipment including processor, storage and other computer peripherals.

Server 120 includes proxy interface 208 and application 220 installed 219 with operating system 218. Server 120 may be provided on conventional hardware equipment including processor, storage and other computer peripherals.

As used herein, term "application proxy" is understood to mean any computer program intended to include one or more instructions corresponding to another application program, such that when the application proxy serves to copy, simulate or emulate functionally, at least in part, the other application program when executed. Further, as used herein, term "proxy interface" is understood to mean any computer program intended to cooperate functionally with the application proxy and couple with or monitor the application program associated with the application proxy.

In accordance with an important aspect of present invention, computer program input and output are controllable and/or virtualizable in a networked client/server computer system configuration. Generally, in a multi-processor network for distributed computing, wherein one or more application programs are provided to run primarily on a particular processor (e.g., server), particularly where execution of such application program(s) is configured for or contemplates usage of computer input, output and/or other media functional facilities (such as input: keyboard, mouse, microphone, etc., and output: display screen, speaker, etc.,) resident locally or associated functionally with such server processor, one or more other processor (e.g., clients) coupled to such server processor effectively executes or appears to execute substantially the same application program executed by the server processor.

Preferably, distributed network processing is achieved by applying a proxy interface to the application program in the server processor, such that a corresponding application proxy program is executable by one or more client processors coupled thereto. In this partitioned computing scheme, control of, interconnection with, or access to input, output or other observable or detectable media instructions, commands, messages, primitives, data streams, signals, or other functionally comparable digital information flow is effectively redirected, substantially filtered, or functionally switched by software and/or equivalent or associated hardware functionality as described as herein, such as including application proxy 213 and proxy interface 219, from being coupled, channeled or monitored by any I/O function or associated media facilities locally resident or functionally peripheral to server processor 120 to substantially equivalent I/O function or associated media facilities locally resident or functionally peripheral to one or more client processor 110.

Hence, in this virtualized I/O manner, one or more application programs 220 may run on one processor system 120, and function as though input, output and/or other observable or detectable media signal information for executing such application programs are available and accessed locally to such system 120, without any substantial modification, interruption or other operational change to such programs 220, but actually or effectively cooperate with one or more other processor system 110 coupled 217 thereto through corresponding application proxy 213 and proxy interface 208 means, such that subject application program I/O and other related or selected I/O processing activity, instructions, messages, primitives, commands, data streams, signals, or other functionally comparable digital information flow are directed, sent or transferred to and/or from I/O facilities 210, 216 available and accessed locally to other processor system 110.

Preferably, when operating, client processor 110 responds to input 210 applied 211 respectively thereto and executes application proxy 213 to generate or apply 215 output 216, so that such client processor 110 effectively appears to execute full application program 220 locally, although subset or partitioned portion of instruction set is provided thereto for local execution. In addition, server processor 120 executes application 220, and proxy interface 208, which coupled thereto, sends input 210 from client processor 110 to server processor 120 so that server processor 120 executes application program 220 according to such applied input and generates therefrom output, which is applied by proxy interface as output 216 of client processor 110. In effect, proxy interface 208, in functional cooperation with application proxy 213, serves to deliver virtual display of output 215 by client processor 110 and collect actual input therefrom for delivery to server processor 120.

Figure 3:
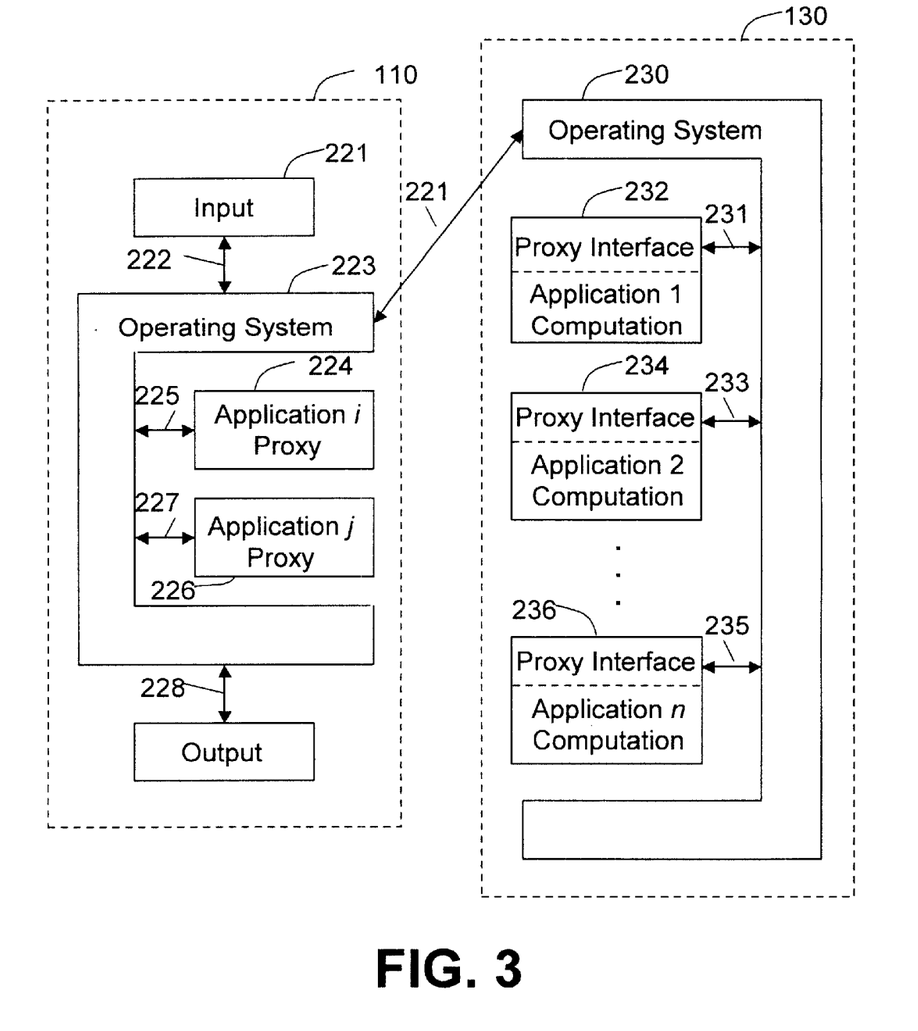
FIGS. 3–7 are block diagrams of computer systems according to alternative embodiments of present invention.

FIG. 3 shows alternate computer system with client unit 110 and server unit 130. Substantially similar to system of FIG. 2, client 110 includes operating system 223 coupled 222, 228 respectively to input 221 and output 228 for virtualized I/O operation as described herein, and server 130 includes operating system 230. In particular, client 110 includes multiple application i . . . j proxies 224, 226 coupled 225, 227 respectively to operating system 223, and server 130 includes multiple application programs and proxy interfaces 232, 234, 236 correspondingly coupled 231, 233, 235 to operating system 230. In this alternate configuration, multiple virtualized I/O data flows using single client/server coupling 221 are contemplated, such that each application proxy communicates with corresponding proxy interface, thereby eliminating data conflict therebetween.

Figure 4:
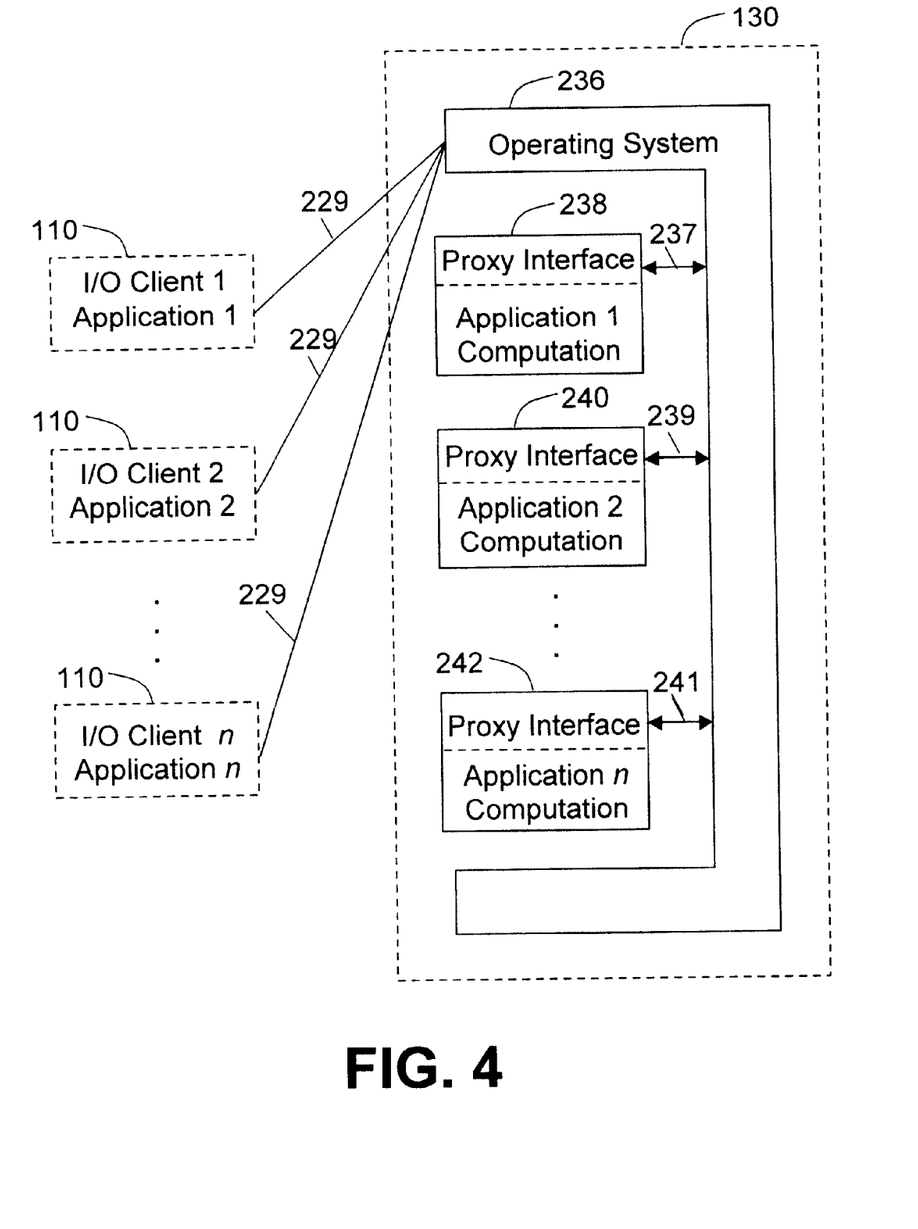

FIG. 4 shows other alternate computer system with multiple client units 110 coupled over multiple link or data flows 229 to server unit 130. Substantially similar to system of FIG. 3, each client 110 includes operating system coupled to input and output for virtualized I/O operation as described herein, and server 130 includes operating system 236. In particular, client 10 includes multiple I/O client applications 110, and server 130 includes multiple application programs and proxy interfaces 238, 240, 242 correspondingly coupled 237, 239, 241 to operating system 236. In this other alternate configuration, multiple data flows use multiple client/server couplings 229 are contemplated, such that each application proxy from multiple client units communicate with corresponding proxy interface at single server unit.

Figure 5:
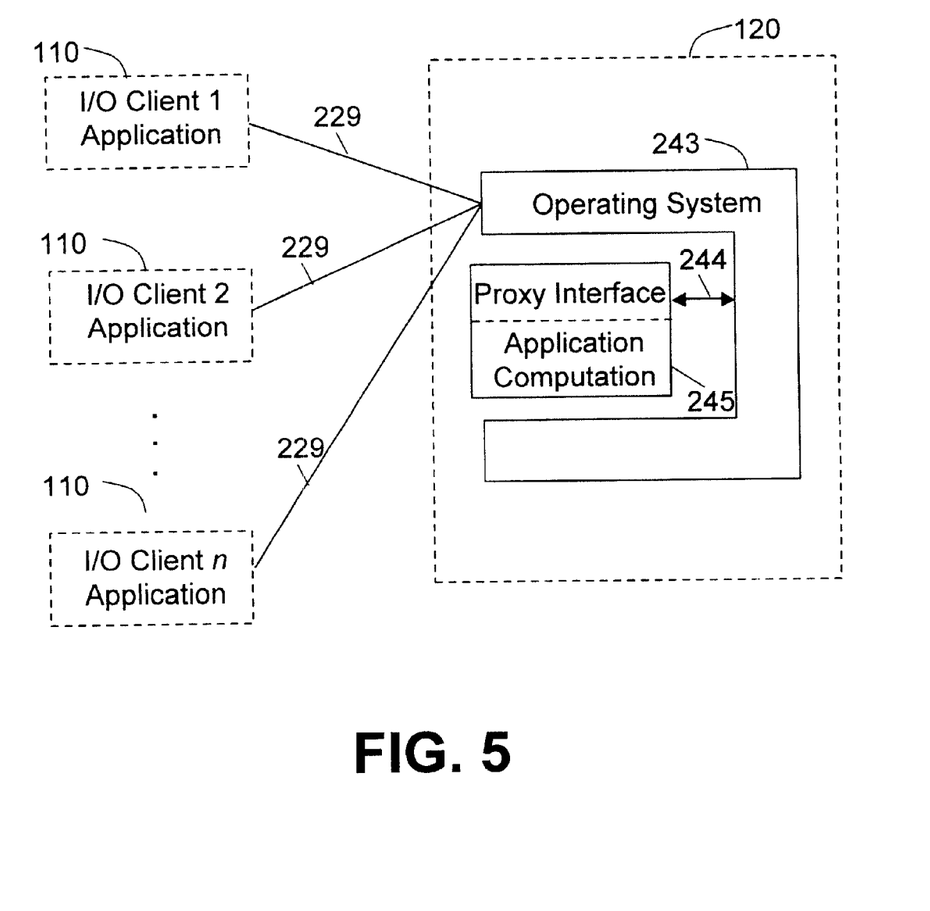

FIG. 5 shows another alternate computer system with multiple client units 110 coupled over multiple link or data flows 229 to server unit 120. Substantially similar to system of FIG. 4, each client 110 includes operating system coupled to input and output for virtualized I/O operation as described herein, and server 120 includes operating system 243 and application program with proxy interface 245 coupled 244 thereto.

In such configuration, I/O streams 229 from multiple clients 110 are provided to server 110, wherein same application program 245 and associated data and states are provided. Hence, such configuration may support centralized client/server applications, where multiple clients communicate with single server under control of particular application or database, such as data warehousing, group conferencing, distance learning, collaboration, bulletin boards, kiosk, vote polling, etc.

Figure 6:
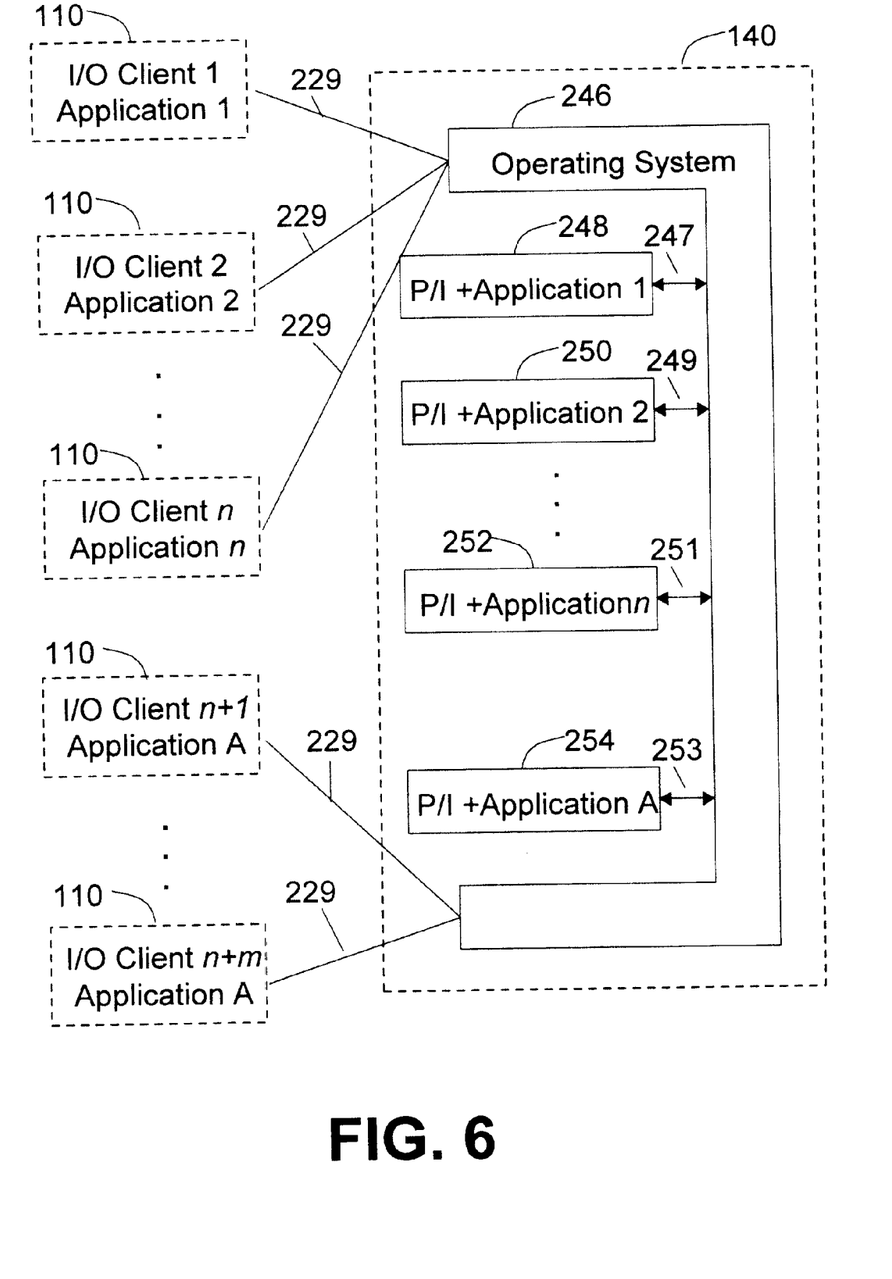

FIG. 6 shows alternative computer system with multiple client units 110 coupled over multiple link or data flows 229 to server unit 140. Substantially similar to system of FIG. 5, each client 10 includes operating system coupled to input and output for virtualized I/O operation as described herein, and server 140 includes operating system 246; however, multiple application programs with proxy interfaces 248, 250, 252, 254 are coupled correspondingly 247, 249, 251, 253 thereto. In such alternative configuration, I/O streams 229 from multiple clients 110 are provided to server 10, wherein multiple application programs and proxy interfaces are provided for access thereto. Such alternative configuration may support centralized, distributed, shared, or other multiple client/server applications.

Figure 7:
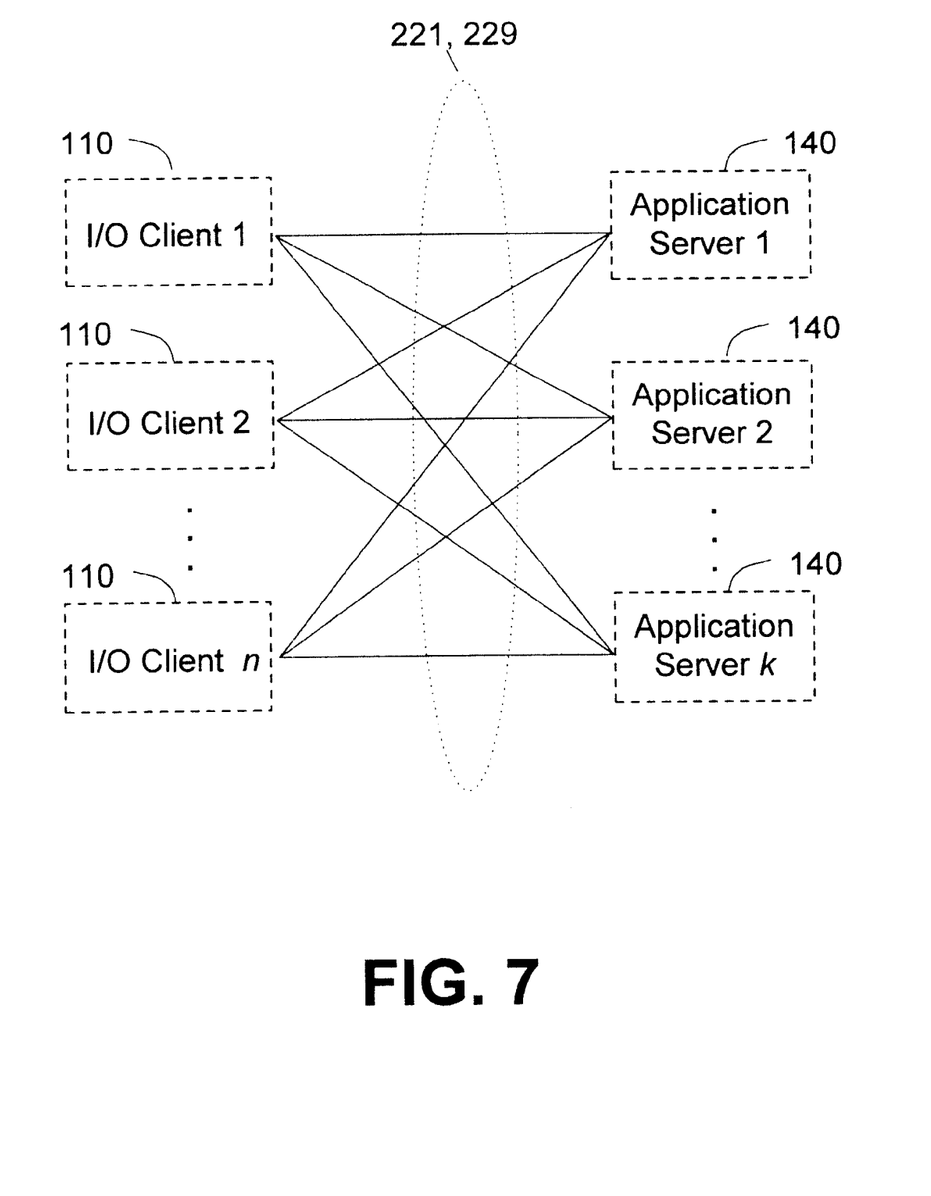

FIG. 7 shows other alternative computer system with multiple client units 110 coupled over multiple shared or dedicated link or data flows 221, 229 to multiple server units 140. Substantially similar to system of FIG. 6, each client 110 includes operating system coupled to input and output for virtualized I/O operation as described herein, and each server 140 includes operating system and application program with proxy interface. In such other alternative configuration, I/O streams 221, 229 from multiple clients 110 are provided to multiple server 110, wherein multiple application programs and proxy interfaces are provided for access thereto. Such other alternative configuration may support load-balancing or fault-tolerant client/server applications.

Figure 8:
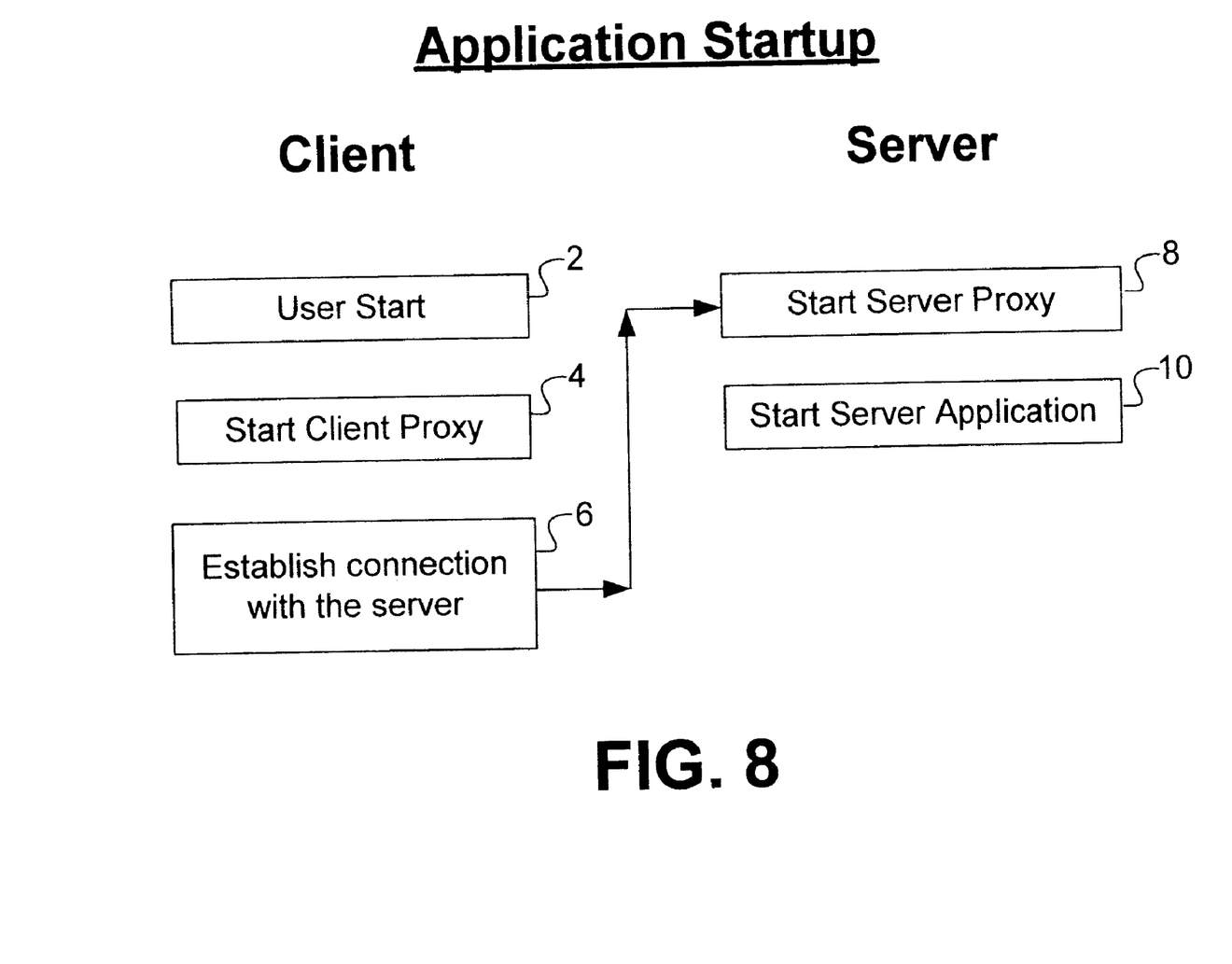
FIG. 8 is a generalized flow chart of processing steps by client and server according to present invention.

FIG. 8 illustrates processing steps performed in series and/or parallel by client and server processing units. Initially 2, user starts client processor, and then starts client application proxy program 4. Next, physical or network connection is made 6 with server processing unit, preferably according to conventional network interconnect protocol stack. After network connection is established on server side, server proxy interface program has been started 8, and server application program also started 10.

Figure 9:
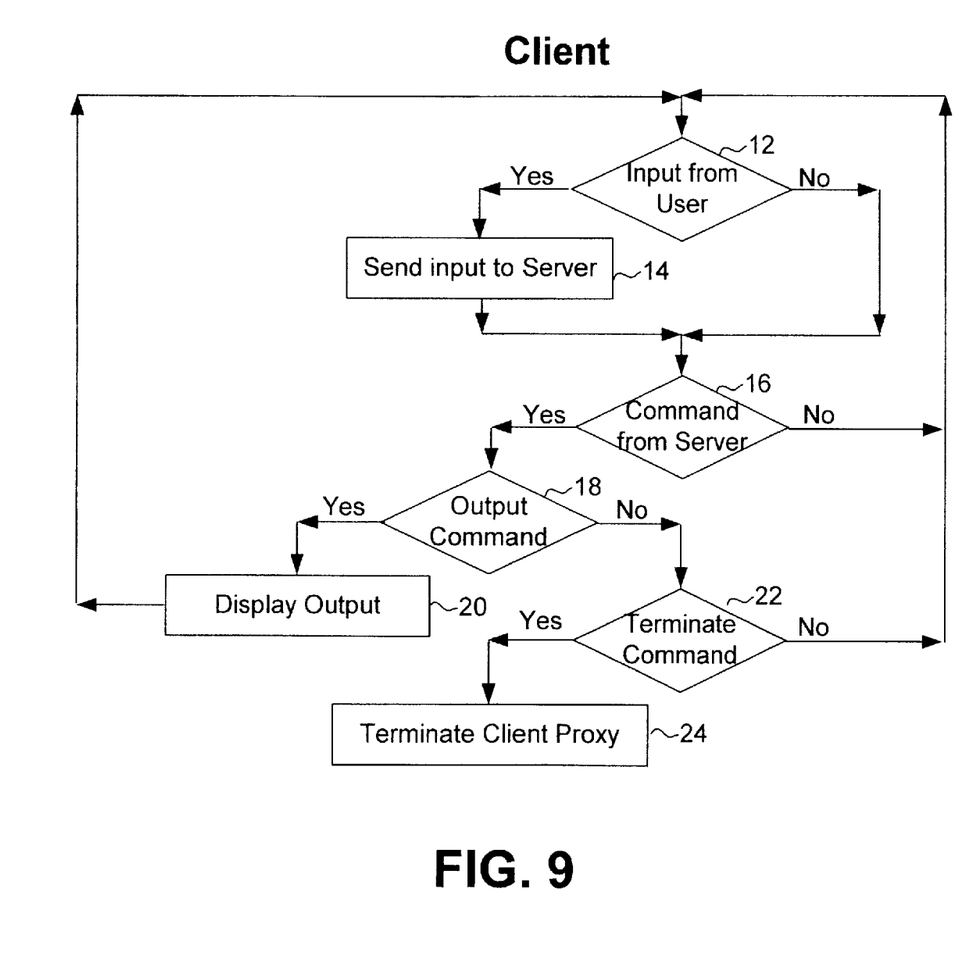
FIG. 9 is a more detailed flow chart f processing steps by client processor according to present invention.

FIG. 9 shows client operational steps which occur preferably after client proxy starts 4. Firstly, client processor determines whether input activity, instructions, messages, primitives, commands, data streams, signals, or other functionally comparable digital information flow (i.e., input) is received 12 from user; if so, then such input is sent 14 to server processor. Then, client processor determines whether any command is received 16 from server. If so, then client processor further determines whether such received command is for output; if so, then such output is displayed 20. Otherwise, if client processor determines that such received command, which is not for output, is terminate indication, then client proxy program is terminated 24. Else, client process flow is repeated as shown.

Figure 10:
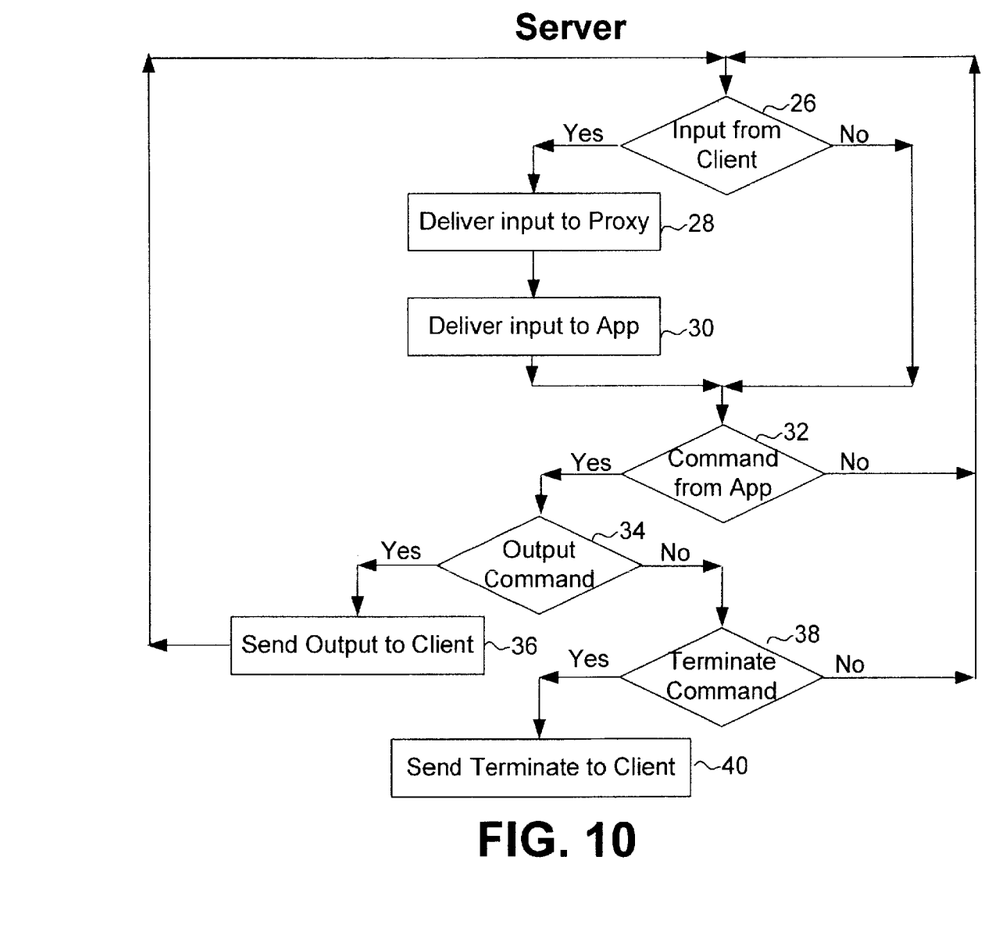
FIG. 10 is a more detailed flow chart of processing steps by server processor according to present invention.

FIG. 10 shows server operational steps which occur preferably after server proxy interface program starts 8. Firstly, server processor determines whether input is received from client 26; if so, then such input is sent 28 to server proxy interface, which further delivers 30 such input to application program. Then, server processor determines 32 whether application generates command; if so, then server processor determines 34 whether such received command is for output as activity, instructions, messages, primitives, commands, data streams, signals, or other functionally comparable digital information flow (i.e., output). If so, then such command output is sent 36 to client. Otherwise, if server processor determines 38 that such received command, which is not for output, is termination, then terminate indication is sent 40 to client. Else, server process flow is repeated as shown.

The foregoing described embodiments of the invention are provided as an illustration and description. It is not intended to limit the invention to the precise form described. Other variations and embodiments are possible in light of the above teaching, and it is thus intended that the scope of the invention not be limited by the detailed description, but rather by the claims as follow.

We claim:

1. A network computing system comprising: a first processing unit comprising a first processor, a first storage, a first input device, a first output device, a first operating system and an application proxy, the first operating system being provided in the first storage for execution by the first processor; and a second processing unit comprising a second processor, a second storage, a second input device, a second output device, a second operating system, an application, and a proxy interface, the second operating system being provided in the second storage for execution by the second processor;

wherein the first processing unit couples through a network connection to the second processing unit for distributed processing of the application therebetween, the application being executable by the second processor; the application proxy being executable by the first processor; the proxy interface being coupled effectively to the application proxy, such that when the second processor executes the application, the proxy interface causes an input signal from the first input device, instead of second input device, to be applied to the second processor executing the application, and an output signal generated by the second processor executing the application to be applied to the first output device, instead of the second output device, wherein control of, interconnection with or access to input, output or other observable or detectable media instructions, commands, messages, primitives, data streams, signals or other functionally comparable digital information flow is effectively redirected, substantially filtered or functionally switched, by software and/or equivalent or associated hardware functionality, from being coupled, channeled or monitored by any I/O function or associated media facilities locally resident or functionally peripheral to a server processor to a substantially equivalent I/O function or associated media facilities locally resident or functionally peripheral to one or more client processors.

2. The method of claim 1, wherein I/O streams from multiple clients are provided to server, wherein same application program and associated data and states are provided, wherein I/O streams from multiple clients are provided to server, wherein multiple application programs and proxy interfaces are provided for access thereto, and wherein I/O streams from multiple clients I/O are provided to multiple server wherein multiple application programs an proxy interfaces are provided for access thereto.

3. The method of claim 1, wherein server proxy interface operates in the context of the server application.

4. A client/server computing system for virtualized input/output comprising:

a client processor, in response to an input applied thereto, executing an application proxy and applying an output; and a server processor for executing an application, a proxy interface being coupled to the application for sending the applied input to the server processor, such that the server processor executes the application in response to such applied input and generates therefrom the applied output, the proxy interface sending such generated output for application to the client processor, wherein control of, interconnection with or access to input, output or other observable or detectable media instructions, commands, messages, primitives, data streams, signals or other functionally comparable digital information flow is effectively redirected, substantially filtered or functionally switched, by software and/or equivalent or associated hardware functionality, from being coupled, channeled or monitored by any I/O function or associated media facilities locally resident or functionally peripheral to a server processor to a substantially equivalent I/O function or associated media facilities locally resident or functionally peripheral to one or more client processors.

5. The system of claim 4 further comprising:

an other client processor, in response to an other input applied thereto, executing the application proxy and applying an other output.

6. The system of claim 4 further comprising:

an other client processor, in response to an other input applied thereto, executing an other application proxy and applying an other output.

7. The system of claim 4 further comprising: an other server processor for executing the application, an other proxy interface being coupled to the application for sending the applied input to the other server processor, such that the other server process or executes the application in response to such applied input and generates therefrom the applied output, the other proxy interface sending such generated output for application to the client processor.

8. The system of claim 4 further comprising:

an other server processor for executing an other application, an other proxy interface being coupled to the other application for sending the applied input to the other server processor, such that the other server processor executes the other application in response to such applied input and generates therefrom the applied output, the other proxy interface sending such generated output for application to the client processor.

9. The method of claim 4, wherein I/O streams from multiple clients are provided to server, wherein same application program and associated data and states are provided, wherein I/O streams from multiple clients are provided to server, wherein multiple application programs and proxy interfaces are provided for access thereto, and wherein I/O streams from multiple clients I/O are provided to multiple server wherein multiple application programs an proxy interfaces are provided for access thereto.

10. The method of claim 4, wherein server proxy interface operates in the context of the server application.

11. In a networked computing system comprising a client processor coupled to a server processor, a method for virtualizing input and output comprising:

a client processor executing a proxy application;

the client processor establishing connection to a server processor;

the server processor executing a proxy interface;

the server processor executing a application;

an output generated by the serve processor when executing the application being provided to the client processor for virtual processing therefrom;

and an input applied to the serve processor when executing the application being provided from the client processor for virtual processing therefrom, wherein control of, interconnection with or access to input, output or other observable or detectable media instructions, commands, messages, primitives, data streams, signals or other functionally comparable digital information flow is effectively redirected, substantially filtered or functionally switched, by software and/or equivalent or associated hardware functionality, from being coupled, channeled or monitored by any I/O function or associated media facilities locally resident or functionally peripheral to a server processor to a substantially equivalent I/O function or associated media facilities locally resident or functionally peripheral to one or more client processors.

12. The method of claim 11, wherein I/O streams from multiple clients are provided to server, wherein same application program and associated data and states are provided, wherein I/O streams from multiple clients are provided to server, wherein multiple application programs and proxy interfaces are provided for access thereto, and wherein I/O streams from multiple clients I/O are provided to multiple server wherein multiple application programs an proxy interfaces are provided for access thereto.

13. The method of claim 11, wherein server proxy interface operates in the context of the server application.

14. In a computing system coupled to a network, a method for virtualizing signal output comprising:

executing by a computer a proxy application;

establishing by the computer a connection to a network;

receiving by the computer a signal from the network;

determining by the computer whether the signal comprises a media signal; and processing by the computer according to the proxy application the media signal to generate a virtual output, wherein control of, interconnection with or access to input, output or other observable or detectable media instructions, commands, messages, primitives, data streams, signals or other functionally comparable digital information flow is effectively redirected, substantially filtered or functionally switched, by software and/or equivalent or associated hardware functionality, from being coupled, channeled or monitored by any I/O function or associated media facilities locally resident or functionally peripheral to a server processor to a substantially equivalent I/O function or associated media facilities locally resident or functionally peripheral to one or more client processors.

15. The method of claim 14, wherein I/O streams from multiple clients are provided to server, wherein same application program and associated data and states are provided, wherein I/O streams from multiple clients are provided to server, wherein multiple application programs and proxy interfaces are provided for access thereto, and wherein I/O streams from multiple clients I/O are provided to multiple server wherein multiple application programs an proxy interfaces are provided for access thereto.

16. The method of claim 14, wherein server proxy interface operates in the context of the server application.

17. In a computing system coupled to a network, a method for virtualizing signal input comprising:

executing by a computer couple to a network a proxy interface and an application;

receiving by the computer a signal from the network;

determining by the computer whether the signal comprises a media signal;

and processing by the computer according to the proxy interface and the application the media signal to use the media signal as a virtual input, wherein control of, interconnection with or access to input, output or other observable or detectable media instructions, commands, messages, primitives, data streams, signals or other functionally comparable digital information flow is effectively redirected, substantially filtered or functionally switched, by software and/or equivalent or associated hardware functionality, from being coupled, channeled or monitored by any I/O function or associated media facilities locally resident or functionally peripheral to a server processor to a substantially equivalent I/O function or associated media facilities locally resident or functionally peripheral to one or more client processors.

18. The method of claim 17, wherein I/O streams from multiple clients are provided to server, wherein same application program and associated data and states are provided, wherein I/O streams from multiple clients are provided to server, wherein multiple application programs and proxy interfaces are provided for access thereto, and wherein I/O streams from multiple clients I/O are provided to multiple server wherein multiple application programs and proxy interfaces are provided for access thereto.

19. The method of claim 17, wherein server proxy interface operates in the context of the server application.

* * * * *